United States Patent [19]

Baumeister

[11] Patent Number: 4,750,057
[45] Date of Patent: Jun. 7, 1988

[54] DE-INTERLACING CIRCUIT FOR SIMULTANEOUS READOUT OF PAIRED FIELDS

[75] Inventor: Hans-Peter Baumeister, Churchville, N.Y.

[73] Assignee: Eastman Kodak Company, Rochester, N.Y.

[21] Appl. No.: 814,457

[22] Filed: Dec. 30, 1985

[51] Int. Cl.$^4$ .............................................. H04N 5/92
[52] U.S. Cl. .................................. 360/35.1; 360/33.1; 358/909; 358/906; 358/335; 358/213.26
[58] Field of Search ................ 360/35.1, 9.1, 22, 33.1; 358/909, 906, 335, 134, 213.15, 213.22, 213.24, 213.26

[56] References Cited

U.S. PATENT DOCUMENTS

| | | | |
|---|---|---|---|
| 3,941,921 | 3/1976 | Yumde | 358/134 |
| 4,130,834 | 12/1978 | Mender | 358/256 |
| 4,302,776 | 11/1981 | Taylor | 358/160 |
| 4,430,675 | 2/1984 | Fujime | 360/10.1 |
| 4,439,785 | 3/1987 | Leonard | 358/120 |
| 4,468,693 | 8/1984 | Fujita | 358/78 |
| 4,481,543 | 11/1984 | Saito | 360/10.1 |
| 4,485,413 | 11/1984 | Fusuta | 358/334 |
| 4,541,016 | 9/1985 | Ochi | 358/228 |
| 4,541,020 | 9/1985 | Kimura | 358/906 |
| 4,553,175 | 11/1985 | Baumeister | 358/906 |
| 4,611,250 | 9/1986 | Yoshinaka | 360/9.1 |
| 4,970,076 | 9/1984 | Arai | 358/312 |

OTHER PUBLICATIONS

The Accordian Image, by Theuwissen et al., Electron: Device Society Meeting, 1984.
Interlacing in Charge Coupled Imaging Devices by Sequin, IEEE Trans on Electron Devices, vol. Ed-20, No. 6, Jun. 1973.

Primary Examiner—Alan Faber
Attorney, Agent, or Firm—David M. Woods

[57] ABSTRACT

A video circuit for use with an electronic still camera retrieves a fully-interlaced frame signal during a single field interval from a full-frame imager and provides . . . during the same interval . . . a pair of de-interlaced field signals for recording upon paired tracks on a magnetic disk. By switching the inputs and outputs of a set of clock-driven line delay elements according to variations of the line rate, the frame signal is converted into simultaneously accessible field signals, at the same time accounting for a time base discrepancy that arises due to readout from the imager at double the line rate.

5 Claims, 3 Drawing Sheets

DE-INTERLACING CIRCUIT FOR SIMULTANEOUS READOUT OF PAIRED FIELDS

BACKGROUND OF THE INVENTION

1. Field of the Invention

This invention pertains to a circuit for converting an interlaced video image, into a pair of de-interlaced video signals of a form suitable for recording upon paired tracks on a recording medium.

2. Description Relative to the Prior Art

A still video recording format has been introduced in which a small, flexible magnetic disk is used to store up to 50 still video pictures. The still pictures originate "live" with an electronic camera or by transfer from another media (e.g. photographic film). The pictures are played back by inserting the recorded disk into a video disk player, which converts the video signals recorded on the disk into a suitable format (e.g., NTSC) television signal. The recording format provides the option of storing a full frame (two circular tracks per picture) for 25 pictures, or a single field (one circular track per picture) for 50 pictures. Which option is preferred depends upon such considerations as storage density, picture quality, and the cost and complexity of the camera used in recording and the player used in playback. Where picture rendition is the paramount consideration, full frame recording and playback is to be preferred.

A full frame still image, like an ordinary television frame, is composed of two fields that are interlaced upon display. Unlike a television frame, however, both fields should be captured concurrently in order to avoid inter-field subject movement, which leads to jitter in a played-back still picture. Simultaneous field capture is provided by a full-frame imager, which collects a charge pattern corresponding to a fully interlaced video frame (see, for example, the line-addressed bucket-brigade structures and the modified CCD frame transfer structures described in "Interlacing in Charge-Coupled Imaging Devices," by C. H. Sequin, *IEEE Trans. on Electronic Devices,* June 1973, pp. 535–541). The usual full-frame imager provides simultaneous pickup and sequential readout of two fields (see, for example, the solid state image pickup device disclosed in U.S. Pat. No. 4,541,016). Sequential processing, however, poses a problem: Besides being exposed at the same time, both fields should be equally treated during signal processing and then recorded simultaneously. If one field is held on the imager longer than the other, the later-recorded field is likely to accumulate more noise-related artifacts, such as dark current, than the earlier-recorded field.

The still video recording format calls for rotating the magnetic disk at the video field rate (i.e. 3600 r.p.m.). Due to the afore-mentioned noise problem, it is desirable for a pair of magnetic heads to simultaneously record the field signals on adjacent tracks in one revolution of the disk. This requires unloading the interlaced signal from the imager and presenting its de-interlaced counterpart in one disk revolution. Though it is feasible to read out the imager during the field rate (1/60 second) this alone is not enough since the fields remain interlaced. Merely separating the lines by field, as it turns out, is also inadequate since each line remains "time-compressed" relative to the recording (and playback) line standard.

SUMMARY OF THE INVENTION

The nature of the problem is better appreciated when it is realized that the field images are effectively recovered from the imager at double the standard field rate. Merely de-interlacing a frame signal is therefore insufficient for the generation and recording of paired field signals. Simultaneous presentation of paired field signals to the signal processing circuit in the camera involves . . . at the same time . . . not only de-interlacing the frame signal but also revamping the time base of the de-interlaced field signals.

The present invention accomplishes both these functions with a set of line delay elements having switched inputs and outputs. The line delay elements are filled one after the other with successive lines of the frame signal according to a clock-in rate based on a multiple of the standard line rate. According to the preferred embodiment, the clock-in rate is based on twice the line rate and each line delay element is thus filled during half the standard line period. A pair of separate, de-interlaced field signals are presented at the output of the line delay elements by emptying pairs of delay elements storing adjacent lines (of paired fields). By basing the clock-out rate on the line rate, the time base discrepancy is automatically accounted for and the two field signals may be recorded in one disk revolution.

BRIEF DESCRIPTION OF THE DRAWINGS

The invention will be described with reference to the figures, wherein.

DESCRIPTION OF THE PREFERRED EMBODIMENT

Figure 1:
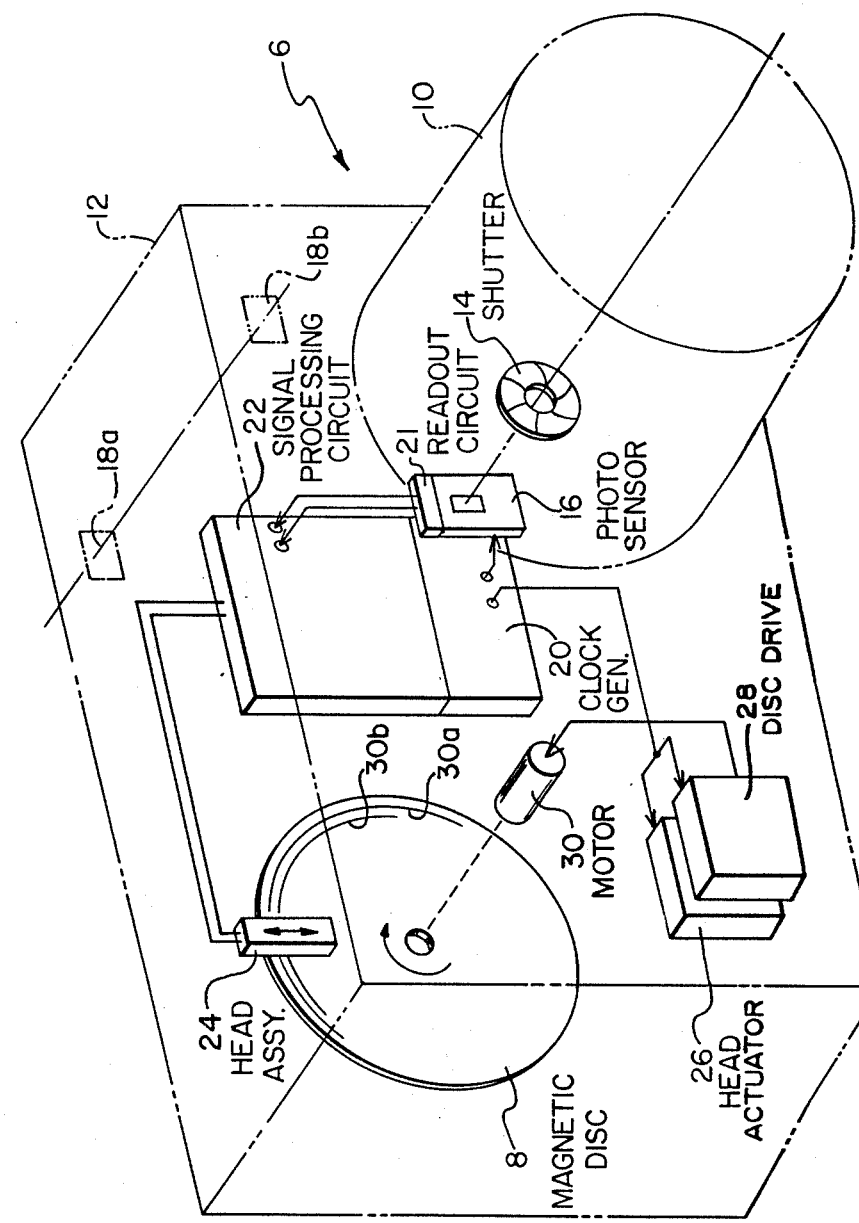
FIG. 1 is a perspective representation of an electronic camera capable of generating video signals corresponding to a still image and recording these signals upon a magnetic disk.
Figure 2:
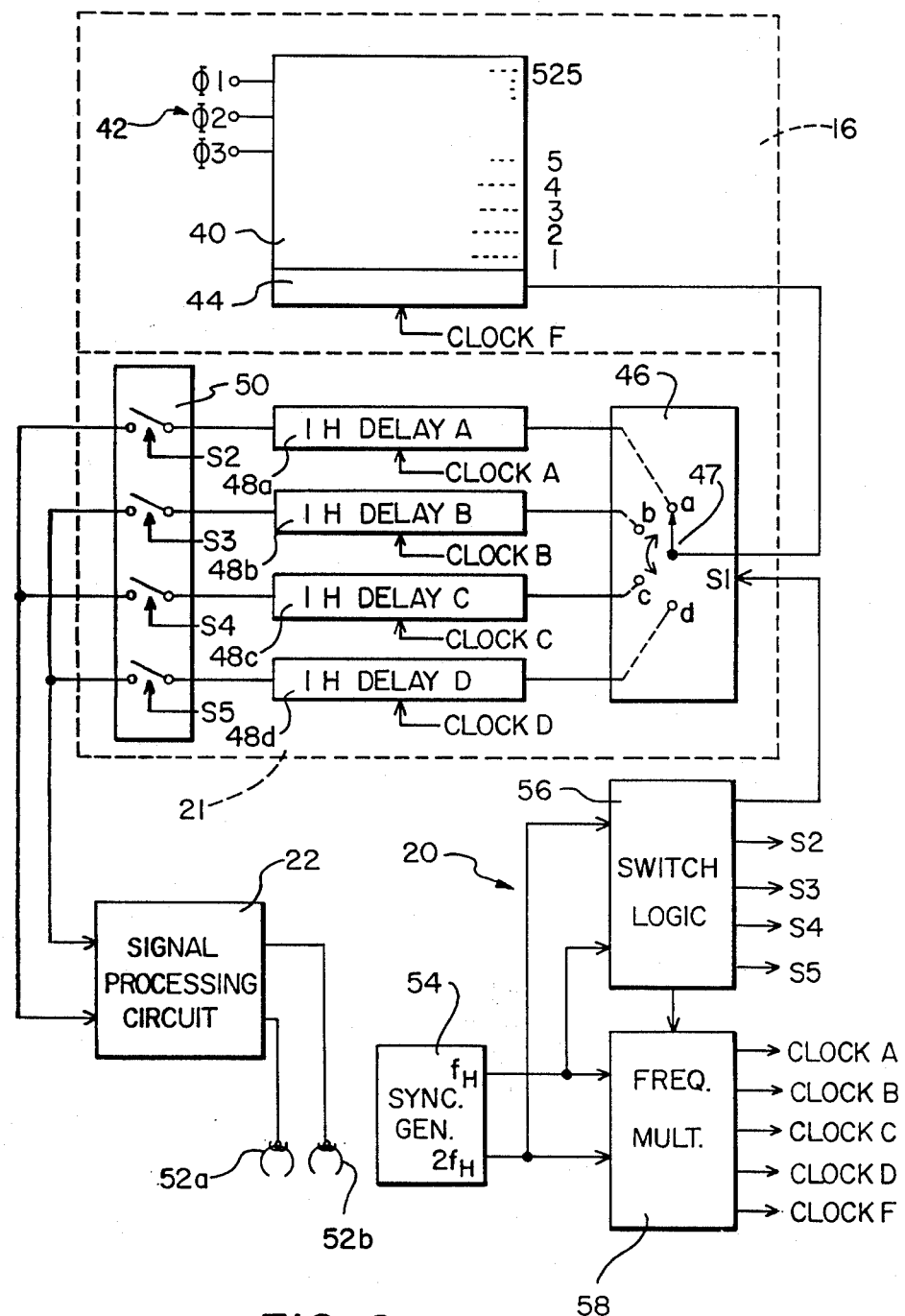
FIG. 2 is a block diagram of an imager and a de-interlacing circuit for simultaneously presenting paired field signals to a recording circuit according to the invention.
Figure 3:
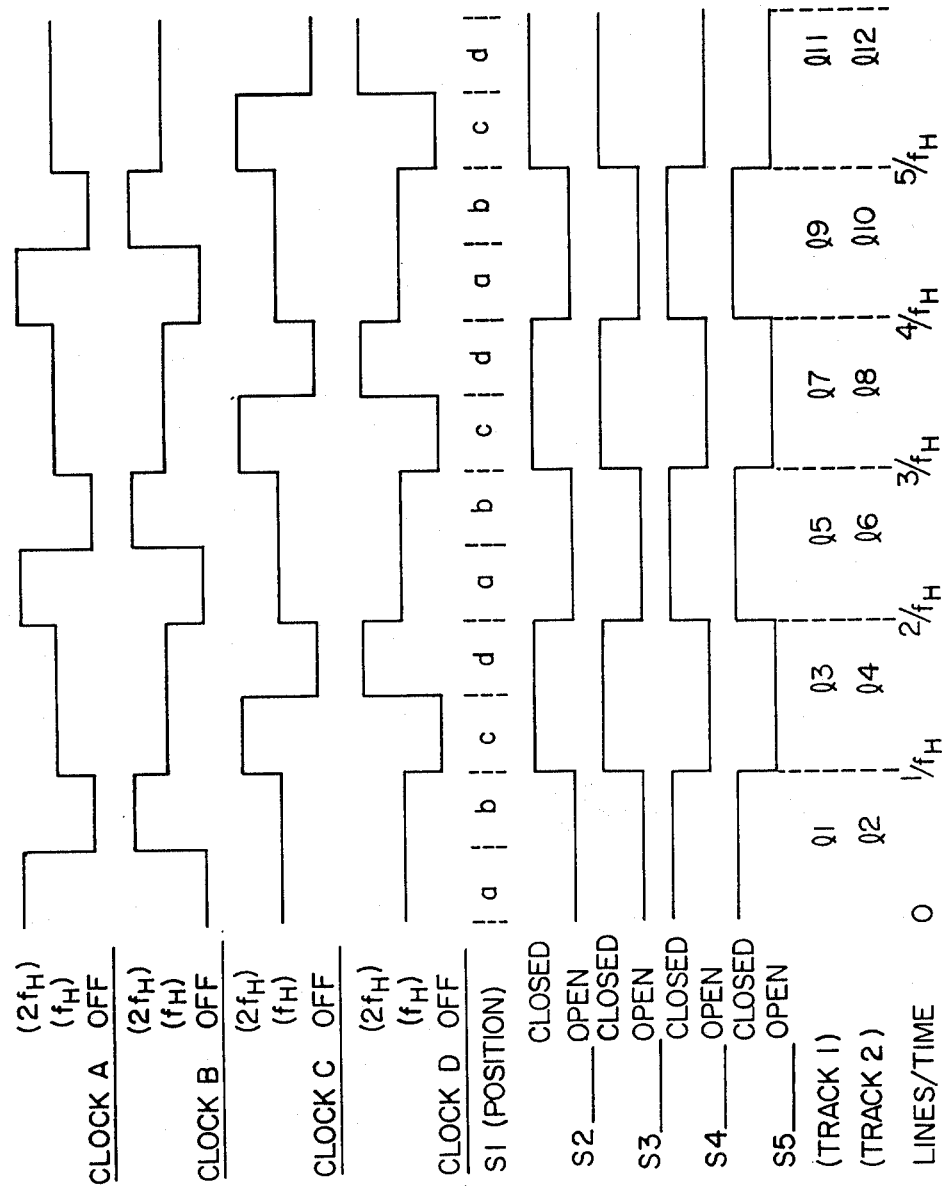
FIG. 3 is a set of waveform diagrams of clocking and switching signals appearing at various points in the block diagram of FIG. 2.

While the present invention is disclosed in detail by reference to the circuit shown by block diagram in FIG. 2 and the associated waveforms shown in FIG. 3, it is helpful in describing the invention to show a typical camera for producing the video signals processed in the circuit of FIG. 2. For this purpose FIG. 1 shows the parts of an electronic camera 6 which originate the signals recorded upon a magnetic disk 8. (The disk 8 is ordinarily protected by an enclosure or cassette, which is not shown in these figures.) The electronic camera 6 includes a lens 10 mounted upon a camera body 12 (both shown by broken line). Behind the lens is a shutter 14 and a photosensitive element 16 which is disposed in the focal plane of the lens 14. An optical viewfinder 18a, 18b is generally shown by broken lines. When the shutter 16 is opened, the active part of the photosensitive element 16—for example, a conventional bucket brigade or charge coupled device—is exposed to incident illumination and an image-wise charge pattern is developed on its surface. A clock generator 20 provides a clocking signal for transferring a video signal—representative of the image-wise charge pattern—from the element 16 through a readout circuit 21 to a signal processing circuit 22.

The readout circuit 21 presents two field signals to the signal processing circuit 22; this is schematically shown by the two lines interconnecting the circuits 21 and 22. The particular operation of the signal processing circuit 22 is not part of this invention; the circuit 22 would, for example, frequency modulate appropriate carriers by color and luminance information from the two field signals. The output of the circuit 22 is a pair of processed signals suitable for recording on the disk 8; these signals are provided to a movable head assembly 24 in which two magnetic heads (not separately shown) are located adjacent the disk 8, one head for each field recording. Two tracks 30a and 30b are shown on the disk 8; each track stores one field of the video signal. The clock generator 20 is also connected to a head actuator 26 and a disk drive 28. The head actuator 26 moves the head assembly 24 from track pair to track pair while the disk drive 28 operates a motor 30 to turn the disk 8 at 60 revolutions per second, i.e., so that one field of video information can be recorded at the field rate on each of the tracks on the disk 8. After a desired number of pictures are taken, the disk 8 is removed from the camera 6 and inserted in suitable apparatus for playing back each picture.

Turning next to FIG. 2, the readout circuit 21 is shown according to the invention as a de-interlacing circuit capable of simultaneously presenting a pair of de-interlaced field signals. A fully-interlaced frame signal is derived from a charge pattern generated on the photosensitive imaging area of a full-frame, charge-coupled imager 40. The imaging area of the imager 40 contains a sufficient array of columns ... each containing a sufficient multiplicity of picture elements (pixels) ... to adequately render two fields of a still picture. By engaging the shutter 14 (see FIG. 1) to control the duration, and termination, of the optical image focussed upon the imager 40, the imager may be read out while the shutter 14 is closed. This means that the usual storage array found on a frame transfer imager may be dispensed with and the whole surface of the imager 40 can be devoted to image exposure. Readout of the charge analog of the image is controlled by a 3-phase clock provided to the imager 40 on the lines 42. Readout proceeds with a vertical transfer of charge packets, an entire row at once, into a horizontal register 44. The frame signal provided by the register 44 is applied to a demultiplexer 46 in the readout circuit 21. The demultiplexer 46 directs the fully-interlaced video frame signal into one of four one-line delay elements 48a, 48b, 48c or 48d according to the condition of its switching elements (shown schematically by the position of an internal switch 47). A de-interlaced video signal ... comprising a pair of field signals ... is generated by operation of the delay elements and passed through a quad bilateral analog switch 50 to the signal processing circuit 22. The simultaneously-presented field signals are recorded on the tracks 30a and 30b (see FIG. 1) by a pair of magnetic recording heads 52a and 52b.

The key to de-interlacing the recovered video signal while restoring its time base lies in the selection, and application, of the clock frequencies for the delay elements 48a, 48b, 48c and 48d and the operating sequences for the demultiplexer 46 and the bilateral switch 50. All of the frequencies and sequences are referenced to either the horizontal line rate signal $f_H$ or the doubled horizontal line rate signal $2f_H$, both of which are provided by a sync generator 54. These clock frequencies and switch sequences are shown in FIG. 3. Each switch sequence is illustrated by the condition of the respective switch ... e.g. open or closed ... during the horizontal line period. Each clock frequency waveform is shown not as a discrete frequency but as a level corresponding to the particular frequency used at a particular time. The clock frequencies shown are either based on the line rate (i.e., $f_H$ * number of pixels/line) or twice the line rate (i.e., 2 * $f_H$ * number of pixels/line).

More specifically, the clock frequencies and switch sequences are selected such that the video frame signal is sequentially applied line by line to the set of one line delay devices 48a, 48b, 48c and 48d at double the line rate and then removed in parallel by toggling between two of the delay devices at the line rate. Doing this requires the clocks to fill the delay devices at a higher frequency than they are emptied, viz., the input clock is proportional to twice the line rate while the output clock is proportional to the line rate. The switch sequencing signals S1, S2, S3, S4 and S5 are generated by a switching logic circuit 56, which provides the waveforms seen in FIG. 3 from the dual line rates provided by the sync generator 54. The clock frequencies, denoted clock A through clock F, are generated by a frequency multiplier 58, which provides a time-varying selection of frequencies as seen in FIG. 3. Using the line signals supplied by the sync generator 54, the frequency multiplier 58 multiplies the line frequency by the number of image pixels per line to arrive at a set of frequencies that are applied to the clock lines in the sequences shown in FIG. 3.

The following example illustrates the operation of the de-interlacing circuit shown in FIG. 2 in connection with the waveforms of FIG. 3. With the demultiplexer switch 47 set for the switch position a by the switching signal S1, the line delay element 48a is filled within half a line period. This is done by having the clock A proportional to twice the line rate ($2f_H$). At the same time the line delay elements 48c and 48d (which are storing previously clocked line signals) are being simultaneously emptied in parallel within a full line period, which is done by having both clocks C and D proportional to the line rate ($f_H$). During readout the switching signals S4 and S5 connect the output lines of the bilateral switch 50 to the line delay elements 48c and 48d. After half a line period has elapsed, and thus with the line delay element 48a filled, the demultiplexer switch 47 is set for the switch contact b and the line delay element 48b is then filled within half a line period (clock B being proportional to twice the line rate ($2f_H$)). Meanwhile, the emptying of the line delay elements 48c and 48d is continuing.

After the line signals presented in parallel to the signal processing circuit 22 have been recorded, the switching signals S2 and S3 connect the output lines of the bilateral switch 50 to the other two line delay elements 48a and 48b (line delay elements 48c and 48d now being disconnected) and the next two lines are presented simultaneously and in parallel to the signal processing circuit 22. For this purpose the clocks A and B are driven according to the line rate. As this is taking place, the switching signal S1 cycles the demultiplexer switch 47 to contacts c and d and consecutively fills line delay elements 48c and 48d at twice the line rate (i.e., clocks C and D are set proportional to twice the line rate). The sequence then repeats itself for as long as there are lines coming from the imager 40. With this arrangement, the imager 40 is read out and both fields are recorded on the disk 8 within one disk revolution.

The invention has been described in detail with particular reference to a presently preferred embodiment, but it will be understood that variations and modifications can be effected within the spirit and scope of the invention. For example, the de-interlacing readout circuit 32 has been portrayed in FIG. 2 as an assemblage of discrete elements but it is clear that the same functions could be integrated together with the charge-coupled device on the imager 40. Furthermore, though analog processing has been shown, it should be clear that the process can be done digitally with appropriate analog to-digital, and digital-to-analog, conversion. Finally, though an exemplary video format is said to include NTSC processing, it is clear that PAL or SECAM standards could be employed.

I claim:

1. Video apparatus for simultaneously generating a pair of separate field signals according to a standard line rate from an interlaced frame signal composed of successive video lines, said video apparatus comprising:
   a plurality of clocked line delay elements;
   means for filling successive delay elements with successive lines of the frame signal according to a clock-in rate greater than the standard line rate;
   output means for processing signals appearing at first and second inputs thereof; and
   means for emptying pairs of delay elements storing adjacent video lines into said first and second inputs according to a clock-out rate equivalent to the standard line rate, thereby simultaneously generating a pair of separate field signals corresponding to the frame signal.

2. Video apparatus as claimed in claim 1 in which said plurality of line delay elements comprises four line delay elements, said means for filling said delay elements comprises means for clocking successive lines into successive delay elements each during half a line period, and said means for emptying pairs of delay elements comprises means for toggling between pairs of delay elements according to the line rate and clocking each stored line pair out during a line period.

3. Video apparatus for simultaneously processing separate field signals obtained from a frame signal, said video apparatus comprising:
   imaging means for retaining a full frame of video information;
   means responsive to said imaging means for generating a fully-interlaced frame signal composed of successive video lines;
   a plurality of delay elements;
   means for sequentially connecting each delay element to said imaging means in synchronism with the generation of successive video lines;
   input means for clocking each connected delay element according to a multiple of the video line rate so as to store successive lines of the frame signal in successive delay elements;
   a signal processing circuit;
   means for connecting said signal processing circuit to a pair of delay elements having adjacent lines stored therewithin; and
   output means for simultaneously clocking a pair of field signals from said connected pair of delay elements according to the video line rate so as to present to said circuit adjacent lines of separate field signals within a line period.

4. Video apparatus as claimed in claim 3 wherein said input clocking means comprises a clock operating proportional to twice the line rate for storing a line in a line delay element within half a line period and said output clocking means comprises a clock operating proportional to the line rate for reading out a pair of lines from a pair of line delay elements within a line period.

5. A video camera for recording a still image composed of two simultaneously-occurring fields of video information on adjacent tracks of a magnetic disk, said camera comprising:
   a full frame image sensor;
   means for exposing said sensor to imaging light so as to generate a charge pattern corresponding to the consecutive lines of an interlaced frame;
   an output register connected to said sensor for generating an image signal corresponding to the charge pattern on said sensor;
   a set of four line delay elements;
   a demultiplexer for routing said image signal to a selected delay element;
   means for clocking the image signal into said selected delay element within half a standard line period;
   means operable at twice the line rate for directing said demultiplexer to present successive video lines to successive selected delay elements;
   a recording circuit for generating a recording signal;
   means for connecting the output of a pair of said delay elements to said recording circuit;
   means for simultaneously clocking the pair of lines stored in said pair of delay elements to said recording circuit within the standard line period;
   means for toggling said output connecting means between pairs of delay elements to continuously present successive video lines of paired fields to said recording circuit; and
   means for applying the recording signal representative of paired fields to adjacent tracks on the magnetic disk.

* * * * *